(12) United States Patent
Fujiwara et al.

(10) Patent No.: US 7,568,334 B2
(45) Date of Patent: Aug. 4, 2009

(54) PIN AND CHAIN

(75) Inventors: Akira Fujiwara, Saitama (JP); Morinobu Kawamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 219 days.

(21) Appl. No.: 11/650,576

(22) Filed: Jan. 8, 2007

(65) Prior Publication Data
US 2008/0015071 A1 Jan. 17, 2008

(30) Foreign Application Priority Data
Jan. 23, 2006 (JP) ............... 2006-013517

(51) Int. Cl.
B21L 9/02 (2006.01)
F16G 13/06 (2006.01)
(52) U.S. Cl. .............. 59/5; 59/4; 59/35.1; 59/78; 474/206; 474/218; 384/283; 384/284; 384/291
(58) Field of Classification Search ............... 59/4, 59/5, 35.1, 78, 86; 474/206, 218; 29/898.1; 384/283, 284, 291, 378
See application file for complete search history.

(56) References Cited

U.S. PATENT DOCUMENTS

| | | | | |
|---|---|---|---|---|
| 4,003,562 A | * | 1/1977 | Kaiser et al. | 384/130 |
| 4,095,416 A | * | 6/1978 | Issard | 59/86 |
| 4,750,325 A | * | 6/1988 | Messier | 59/5 |
| 4,914,903 A | * | 4/1990 | Bernt et al. | 474/218 |
| 5,197,274 A | * | 3/1993 | Braun | 59/78 |
| 5,697,206 A | * | 12/1997 | Otani et al. | 59/4 |
| 5,857,318 A | | 1/1999 | Odai et al. | |
| 2003/0087747 A1 | | 5/2003 | Nagai et al. | |

FOREIGN PATENT DOCUMENTS

| | | |
|---|---|---|
| FR | 523 849 A | 8/1921 |
| JP | 63 259247 A | 10/1988 |
| JP | 3-153942 A | 7/1991 |

* cited by examiner

Primary Examiner—David B Jones
(74) Attorney, Agent, or Firm—Arent Fox LLP

(57) ABSTRACT

A pin is relatively rotatably fitted into a pin hole formed in an outer link plate of a chain. A plurality of helical grooves are formed on an outer circumferential surface of the pin. A pitch P between adjacent helical grooves in the axial direction is equal to or less than a width in the axial direction of the pin hole of the outer link plate. At least one helical groove is arranged to oppose an arbitrary generatrix on an inner circumferential surface of the pin hole. Also, when a radius of the pin is R and a relative rotation angle with the mating member is $\theta$, a pitch P' in the circumferential direction between adjacent helical grooves is $R\theta$ or less. Thus, at least one helical groove is arranged to always pass each position in a sliding range between the pin and the pin hole.

18 Claims, 11 Drawing Sheets

PIN AND CHAIN

RELATED APPLICATION DATA

The present invention is based upon Japanese priority application No. 2006-13517, which is hereby incorporated in its entirety herein by reference.

BACKGROUND OF THE INVENTION

1. Field of the Invention

The present invention relates to a pin and a bendable chain. The pin is rotatably supported by a pin hole of a mating member and has a cylindrical outer circumferential surface about an axis with at least one helical groove formed therein. The bendable chain has link plates connected to each other by a plurality of the pins.

2. Description of the Related Art Japanese Patent Application Laid-Open No. 3-153942 discloses a conventional silent chain wound around sprockets to transmit a driving force, wherein a helical groove is formed on an outer circumferential surface of a pin connecting a link plate and a guide plate. To lubricate the silent chain, oil is supplied through the groove to sliding portions of an inner circumferential surface of a pin hole formed in the link plate and the outer circumferential surface of the pin.

In the conventional silent chain, only one helical groove is formed on the outer surface of the pin connecting the link plate, and only one pitch (one winding) of the helical groove is formed for the entire length of the pin. Therefore, there exists a possibility that oil from the helical groove does not reach the sliding portions of the pin and the link plate depending on the positional relationship between the helical groove of the pin and the link plate. As such, an insufficient lubrication effect on the sliding portions may result which reduces the durability of the assembly. Particularly, abrasion is easily generated in a portion of the outer circumferential surface of the pin which is brought into strong contact with the inner surface of the pin hole due to a tensile force of the silent chain, leading to a problem that the silent chain stretches as the abrasion continues. In order to solve this problem, it is conceivable that the phase of the helical groove of the pin can be aligned with the link plate, but such an arrangement results in a problem wherein the number of assembling processes increases as do the costs associated with manufacturing the silent chain.

The present invention has been achieved with the above circumstances in view, and has as an aspect to improve the lubrication of a pin slidably fitted into a pin hole of a mating member or a link plate.

SUMMARY OF THE INVENTION

In order to achieve the above aspect, according to a first feature of the present invention, a pin comprises a cylindrical outer circumferential surface about an axis with at least one helical groove formed therein. The pin is rotatably supported by a pin hole of a mating member, wherein a pitch between the adjacent helical grooves in an axial direction is equal to or less than a width in the axial direction of the pin hole of the mating member.

With the first feature, at least one helical groove is formed on the outer circumferential surface, and the pitch between adjacent helical grooves in the axial direction of the pin is equal to or less than the width of the pin hole in the axial direction. Thus, it is possible to improve lubrication effect by arranging at least one helical groove opposite an opposing arbitrary generatrix on an inner circumferential surface of the pin hole without considering a phase of the pin during assembly.

According to a second feature of the present invention, in addition to the first feature, the pitch between adjacent helical grooves in the axial direction is at least half the width in the axial direction of the pin hole.

With the second feature, the pitch of the adjacent helical grooves in the axial direction is at least half the width of the pin hole. Therefore, the maximum number of helical grooves opposing the arbitrary generatrix of the pin hole is limited or reduced to two, wherein a contact area between the outer circumferential surface of the pin and the inner circumferential surface of the pin hole is secured to prevent an increase in contact surface pressure.

According to a third feature of the present invention, a pin comprises a cylindrical outer circumferential surface about an axis with at least one helical groove formed therein. The pin is rotatably supported by a pin hole of a mating member, wherein, when a radius of the pin is R and a relative rotation angle with the mating member is $\theta$, which is less than $2\pi$, a pitch in the circumferential direction between adjacent helical grooves is equal to or less than $R\theta$.

With the third feature, when the radius of the pin is R and the relative rotational angle between the pin and the mating member is $\theta$, the pitch in the circumferential direction of the adjacent helical grooves is $R\theta$ or less. Thus, the helical groove passes all the positions on the inner circumferential surface of the pin hole at least once while the pin is relatively rotated by the angle $\theta$ with respect to the mating member. Therefore, the lubrication effect is improved without considering or worrying about the phase of the pin during assembly.

According to a fourth feature of the present invention, in addition to any of the first-to-third features, the outer circumferential surface of the pin includes a coating which includes a coating base and hard particles dispersed in a scattering manner therein.

With the fourth feature, since the coating is formed on the outer circumferential surface of the pin, it is possible to increase the hardness and oil retainability of the outer circumferential surface of the pin, wherein abrasion due to sliding contact with the pin hole is suppressed.

According to a fifth feature of the present invention, there is provided a chain having a plurality of link plates which include the mating members. The link plates are connected to each other by the pins according to any of the first-to-fourth features so that the chain can bend. Each link plate has a recess groove which provides a connection between the pin holes formed at opposite ends of the link plate and guides oil to the outer circumferential surfaces of the pins.

With the fifth feature, since the pin holes are connected by a recess groove, oil is guided to the outer circumferential surfaces of the pins by the recess groove and is supplied to the helical grooves.

According to a sixth feature of the present invention, there is provided a chain having a plurality of link plates which include the mating members. The link plates are connected to each other by the pins according to any of the first-to-fourth features so that the chain can bend. Each link plate has a recess portion which provides a connection between a part of an outer edge of the link plate and the pin hole and guides oil to the outer circumferential surfaces of the pins.

With the sixth feature, since the recess portion connecting a part of the outer edge and the pin hole is formed on the link plate of the chain, oil is guided through the recess portion to the outer circumferential surface of the pin and is supplied to the helical grooves.

The above-mentioned aspect, other aspects, characteristics, and advantages of the present invention will become apparent from a preferred embodiment, which will be described in detail below, along with other embodiments, by reference to the attached drawings.

DESCRIPTION OF THE PREFERRED EMBODIMENTS

Figure 1:
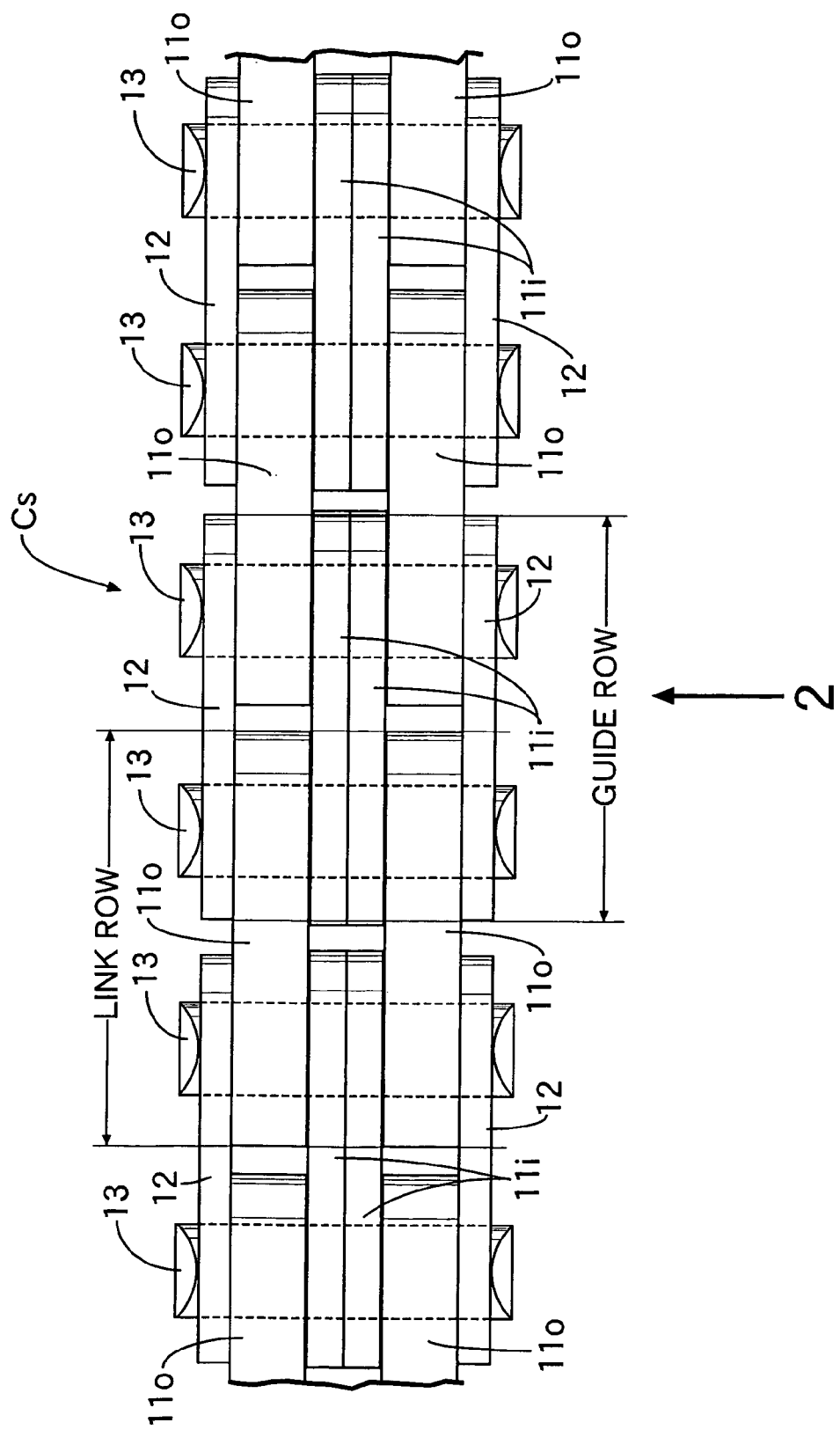
FIG. 1 is a side view of a silent chain according to a first embodiment of the present invention.
Figure 2:
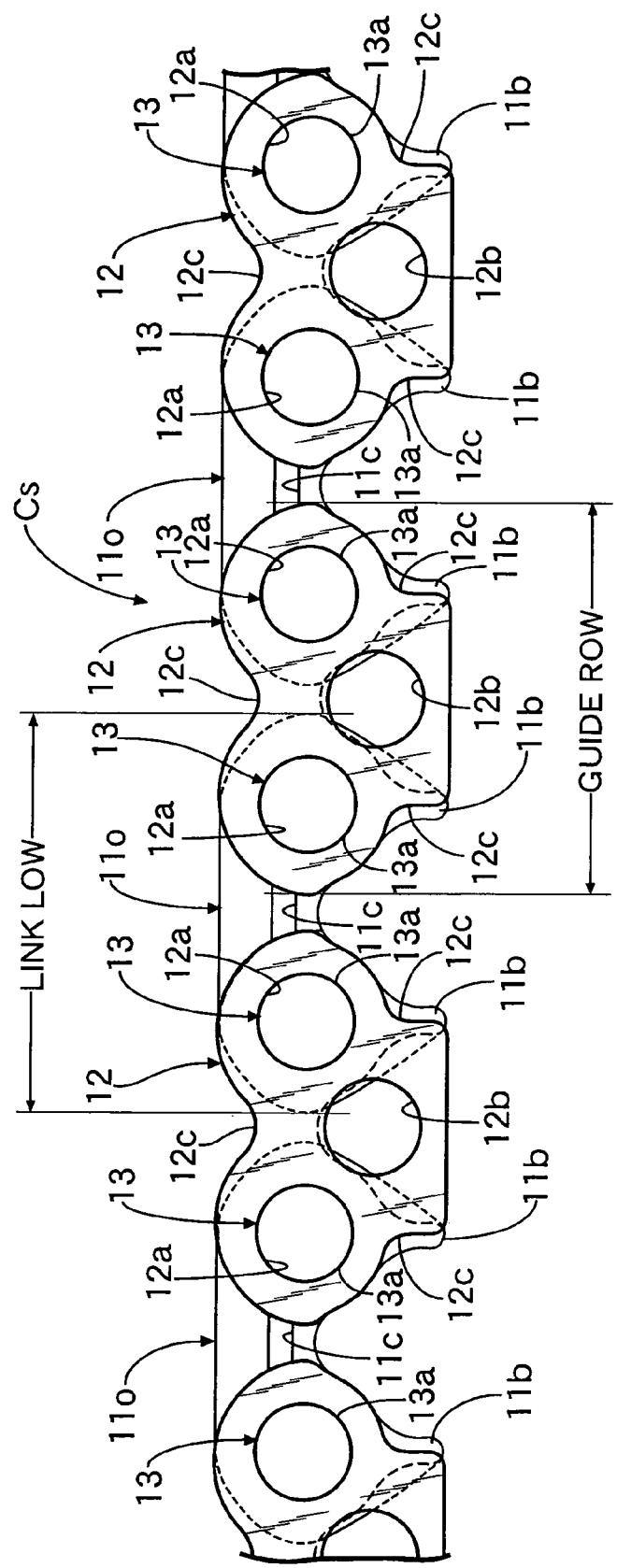
FIG. 2 is a view taken from the direction of arrow 2 in FIG. 1.
Figure 3:
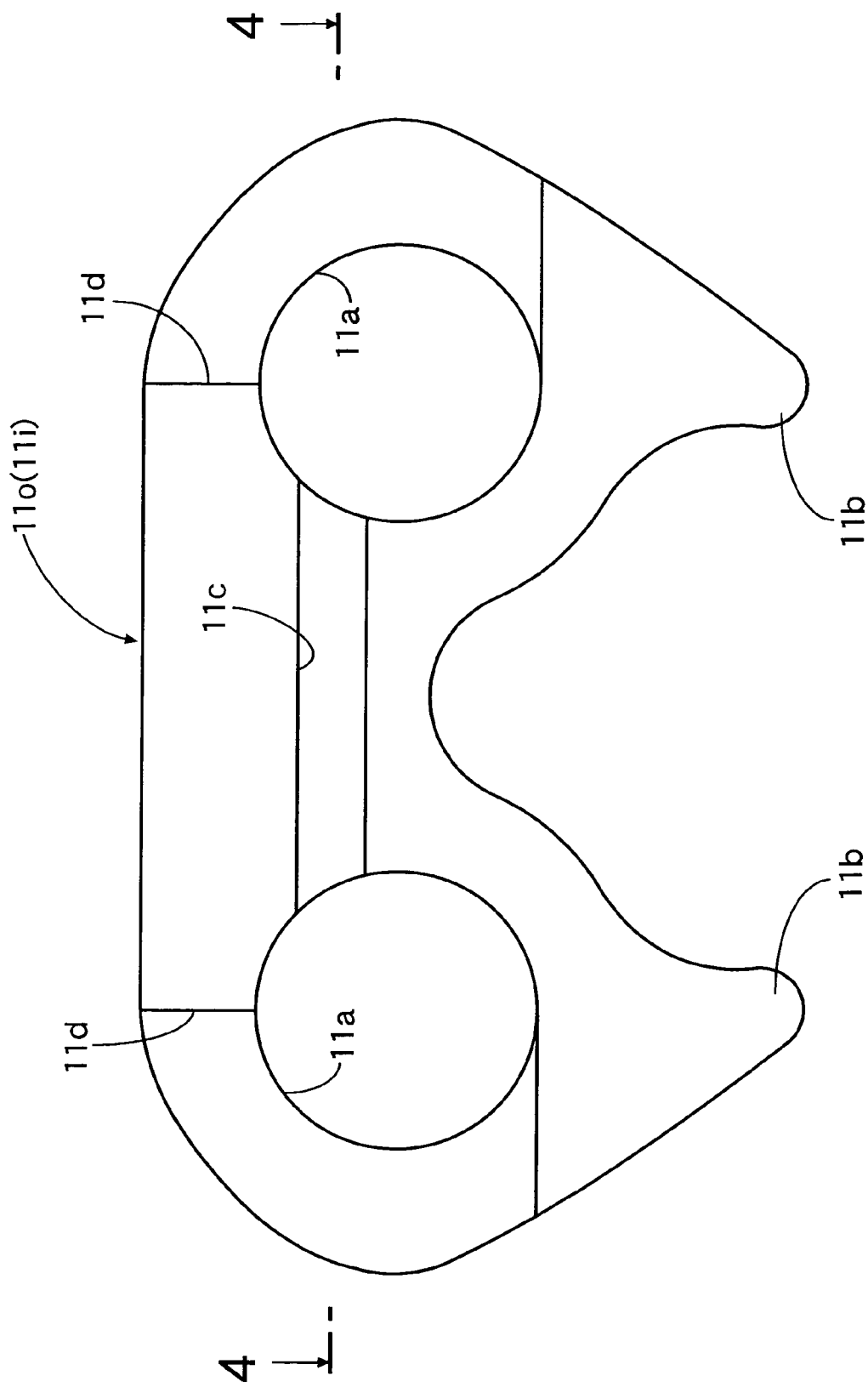
FIG. 3 is a front view of a link plate.
Figure 4:
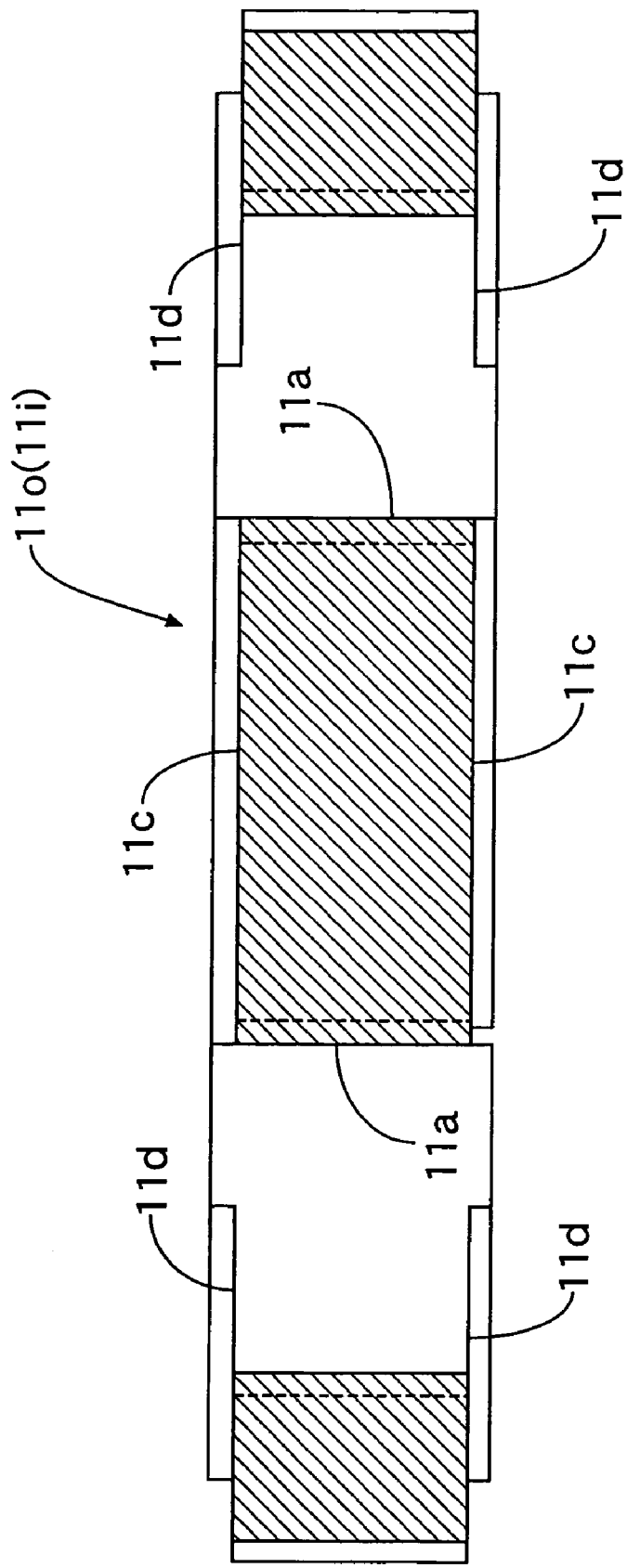
FIG. 4 is a cross-sectional view taken along line 4-4 of FIG. 3.

As shown in FIGS. 1 and 2, a silent chain Cs wound around sprockets and transmitting a driving force with a low noise is constructed by combining four types of members, that is, inner link plates 11i, outer link plates 11o, guide plates 12, and pins 13. Guide rows, each including two inner link plates 11i and two guide plates 12, and link rows, each including two outer link plates 11o, are alternately linked to each other by the pins 13.

The thickness of the inner link plate 11i is half that of the outer link plate 11o. The thickness of the inner link plate 11i is equal to that of the guide plate 12. Therefore, the total thickness of the two inner link plates 11i and the two guide plates 12 of the guide row is substantially equal to the total thickness of the two outer link plates 11o of the link row. As such, a tension load acting on the silent chain Cs is evenly distributed to the plates 11i, 11o and 12 which reduces the amount of stretching ordered by the silent chain Cs. Also, by stacking two inner link plates 11i in the guide row, the resulting impact energy, from when the inner link plates 11i are meshed with the sprocket, is absorbed, thereby reducing vibration and noise.

As is clear from FIGS. 1 to 4, the outer link plate 11o, which is a plate-shaped member, includes two pin holes 11a located at opposite ends in the longitudinal direction and two claws 11b protruding from a region near the two pin holes 11a toward the sprocket. The claws 11b buffer the impact from when the silent chain Cs is meshed with the sprockets. Also, recess grooves 11c are provided on opposite surfaces of the outer link plate 11o and connect the two pin holes 11a to each other, as are recess portions 11d which connect each pin hole 11a to the outer edge of the outer link plate 11o. The recess grooves 11c are formed eccentrically with respect to a line segment connecting centers of the two pin holes 11a in order to prevent the outer link plate 11o from cracking.

The structure of the inner link plate 11i is the same as that of the above-described outer link plate 11o except the thickness of the inner link plate 11i is thinner compared thereto.

Further, the guide plate 12, which is a plate-shaped member, includes two pin holes 12a, which are located at opposite ends in the longitudinal direction; one opening 12b, which is located at a center in the longitudinal direction; and three notches 12c cut inward from the outer edge. The opening 12b and notches 12c reduce the weight of the guide plate 12.

The pin 13 penetrates the pin holes 11a of the two inner link plates 11i and the pin holes 11a of the two outer link plates 11o to be capable of relative rotation. The pin 13 is press fitted into the pin holes 12a of the two guide plates 12 outside the outer link plates 11o, and fixed by crimping to prevent detachment.

Figure 5:
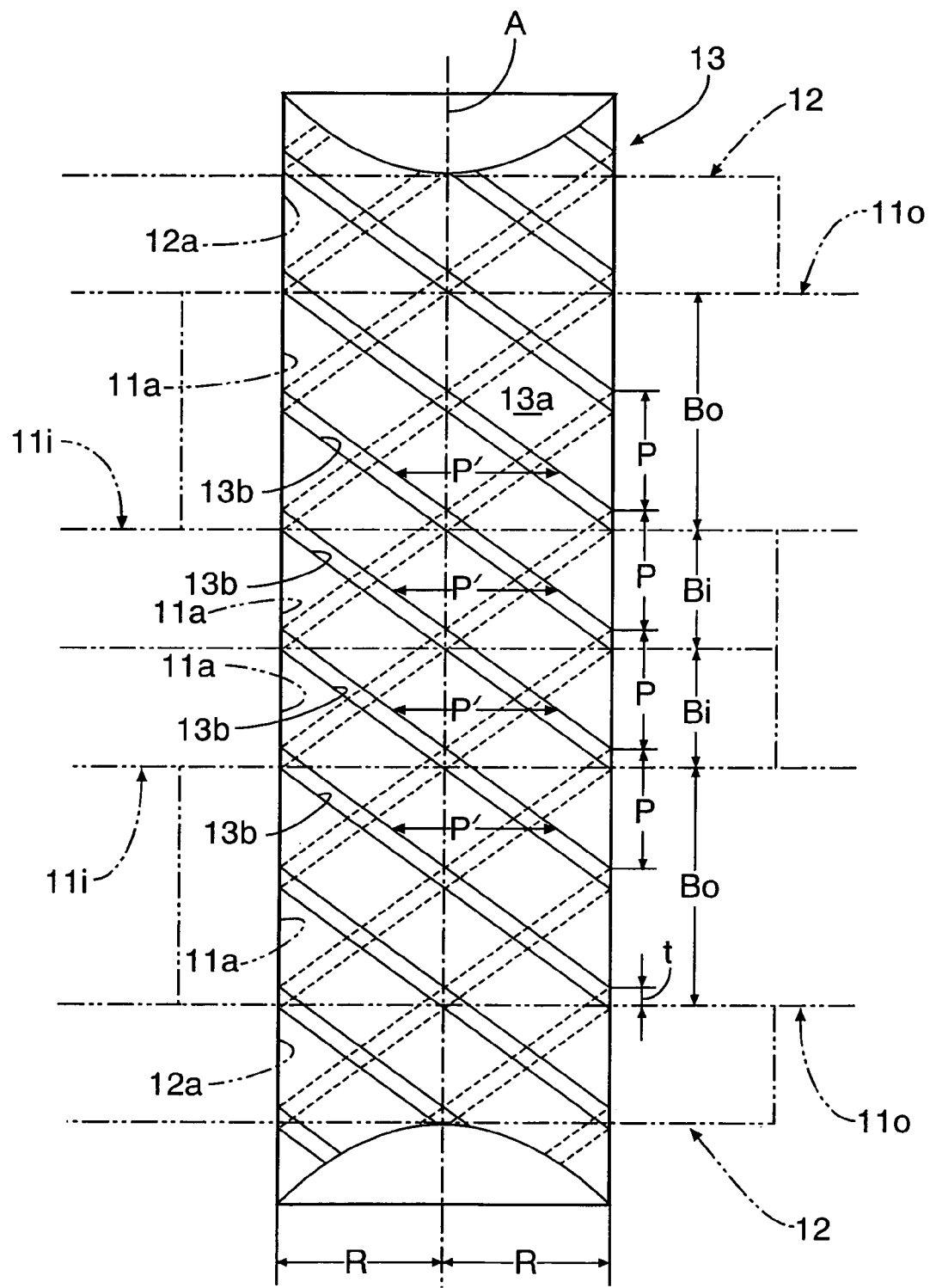
FIG. 5 is a front view of a pin used for explaining a second embodiment of the present invention.

As is clear from FIG. 5, the pin 13 is a columnar member having an axis A and a plurality of helical grooves 13b formed on an outer circumferential surface 13a with a phase difference of 90°. The pitch between the adjacent helical grooves 13b in the axial direction is denoted by P. A width Bo in the axial direction of the pin hole 11a of the thicker outer link plate 11o is twice as large as a width Bi in the axial direction of the thinner inner link plate 11i. A groove width t of the helical groove 13b is preferably one-sixth or less of the width Bi in the axial direction of the pin hole 11a of the inner link plate 11i. The depth of the helical groove 13b is preferably one-twentieth or less of the radius R of the pin 13.

In this embodiment, in order to improve lubrication of the sliding portions of the pin 13 and the pin holes 11a of the outer and inner link plates 11o and 11i, the pitch P in the axial direction of the helical groove 13b of the pin 13 is set to be equal to the width Bi in the axial direction of the pin hole 11a of the inner link plate 11i (P =Bi). With such a structural arrangement, one helical groove 13b of the pin 13 opposes the inner circumferential surface of the pin hole 11a of the inner link plate 11i, while two helical grooves 13b of the pin 13 oppose the inner circumferential surface of the pin hole 11a of the outer link plate 11o.

The pin 13 of the above-mentioned structure is manufactured according to the following steps.

First, a long wire rod cut at a predetermined length is barrel-polished to chamfer its edges; the helical grooves 13b are then formed by rolling; the surface of the pin 13 is centerless-polished and then barrel-polished to be glazed; and lastly, the surface of the pin is subjected to a hard coating treatment.

Figure 6:
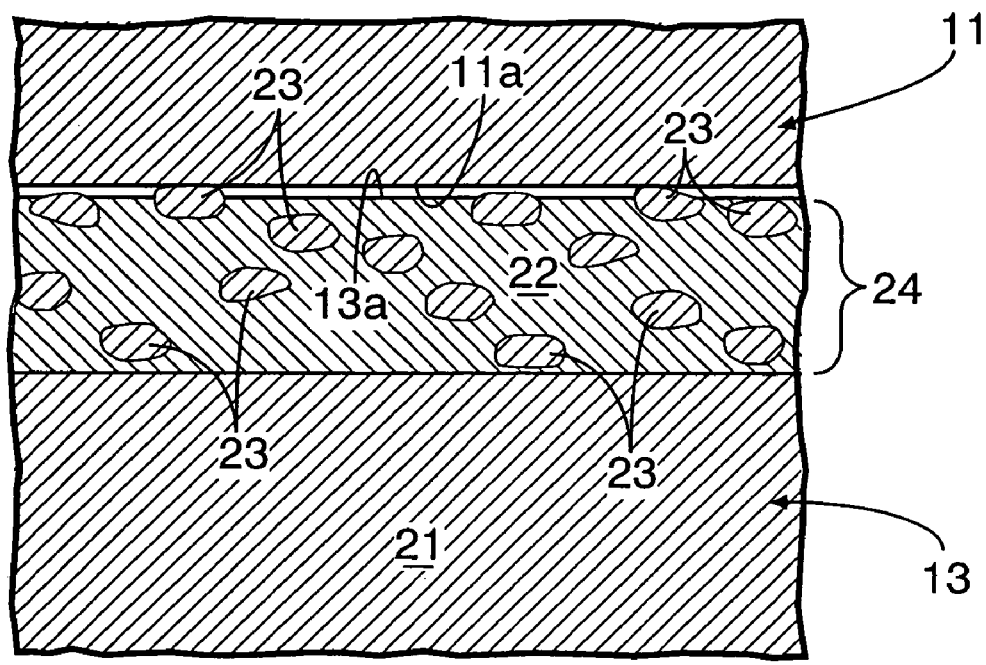
FIG. 6 is an enlarged sectional view of a surface of the pin shown in FIG. 5.

Specifically, as shown in FIG. 6, a coating 24 is formed on the surface of a base material 21 of the pin 13. The coating 24 includes an abrasion-resistant coating base 22 formed from a hard inorganic material, e.g., vanadium oxide, and hard particles 23 made of aluminum oxide, for example, diffused in a scattering manner in the coating base 22. The hard coating treatment on the surface of the pin 13 is disclosed in detail in Japanese Patent Application Laid-open No. 2003-139199.

Next, operation of the embodiment having the above-described structure will be described.

Oil adhering to the silent chain Cs wound and circulated around the sprockets is retained in the recess grooves 11c and the recess portions 11d of the outer and inner link plates 11o and 11i. The oil flows therefrom into the helical grooves 13b on the outer circumferential surface 13a of the pin 13. Therefore, a sufficient amount of oil is supplied to the helical grooves 13b.

Since the pitch P in the axial direction of the helical grooves 13b of the pin 13 is set equal to the width Bi in the axial direction of the pin hole 11a of the thinner inner link plate 11i, one helical groove 13b opposes an arbitrary generatrix on the inner circumferential surface of the pin hole 11a. Therefore, a sufficient amount of oil is supplied to the sliding portions of the pin 13 and the inner link plate 11i which preserves an oil coating layer thereon to improve the durability of the silent chain Cs. Since the width Bo in the axial direction of the pin hole 11a of the thicker outer link plate 11o is twice as large as the width Bi in the axial direction of the pin hole 11a of the inner link plate 11i, two helical grooves 13b oppose an arbitrary generatrix on the inner circumferential surface of the pin hole 11a of the outer link plate 11o. Also, in this case, a sufficient amount of oil is supplied to the sliding portions of the pin 13 and the outer link plate 11o which preserves an oil coating layer thereon to improve the durability of the silent chain Cs.

Since the two guide plates 12, constituting the guide row, and the two pins 13 are integrated by press-fitting and crimping, the two inner link plates 11i supported by the two pins 13 are not relatively rotated with respect to the two pins 13, and the lubrication condition of the sliding portions becomes relatively gentle. In contrast, since the two outer link plates 11o constituting the link row are relatively rotated with respect to the two pins 13, the lubrication condition of the sliding portions becomes relatively severe. However, in the first embodiment, even in the outer link plate 11o under the severe lubrication condition, at least one (e.g., two) helical groove 13b opposes the arbitrary generatrix on the inner circumferential surface of the pin hole 11a which preserves an oil coating layer thereon.

In the above-mentioned first embodiment, the pitch P of the helical grooves 13b is set equal to the width Bi in the axial direction of the pin hole 11a of the inner link plate 11i, but the pitch P may be set to be less than the width Bi. With this arrangement, one or more helical grooves 13b oppose the arbitrary generatrix on the inner circumferential surface of the pin hole 11a of the inner link plate 11i or the outer link plate 11o which further reliably improves the durability of the silent chain Cs.

However, the pitch P in the axial direction between adjacent helical grooves 13b is set to be half or more of the width Bo in the axial direction of the pin hole 11a of the outer link plate 11o (P≧Bo/2). Therefore, the pitch P naturally becomes a equal to or more of the width Bi (Bi=Bo/2) in the axial direction of the pin hole 11a of the inner link plate 11i (P≧Bi).

With this arrangement, the number of the helical grooves 13b opposing an arbitrary generatrix of the pin hole 12a is suppressed to be a maximum of two, thereby securing a contact area between the outer circumferential surface 13a of the pin 13 and the inner circumferential surface of the pin hole 12a to suppress an increase of the contact surface pressure. In the first embodiment, one helical groove 13b opposes an arbitrary generatrix of the pin hole 11a of the inner link plate 11i, while two helical grooves 13b oppose the arbitrary generatrix of the pin hole 11a of the outer link plate 11o.

Figure 7:
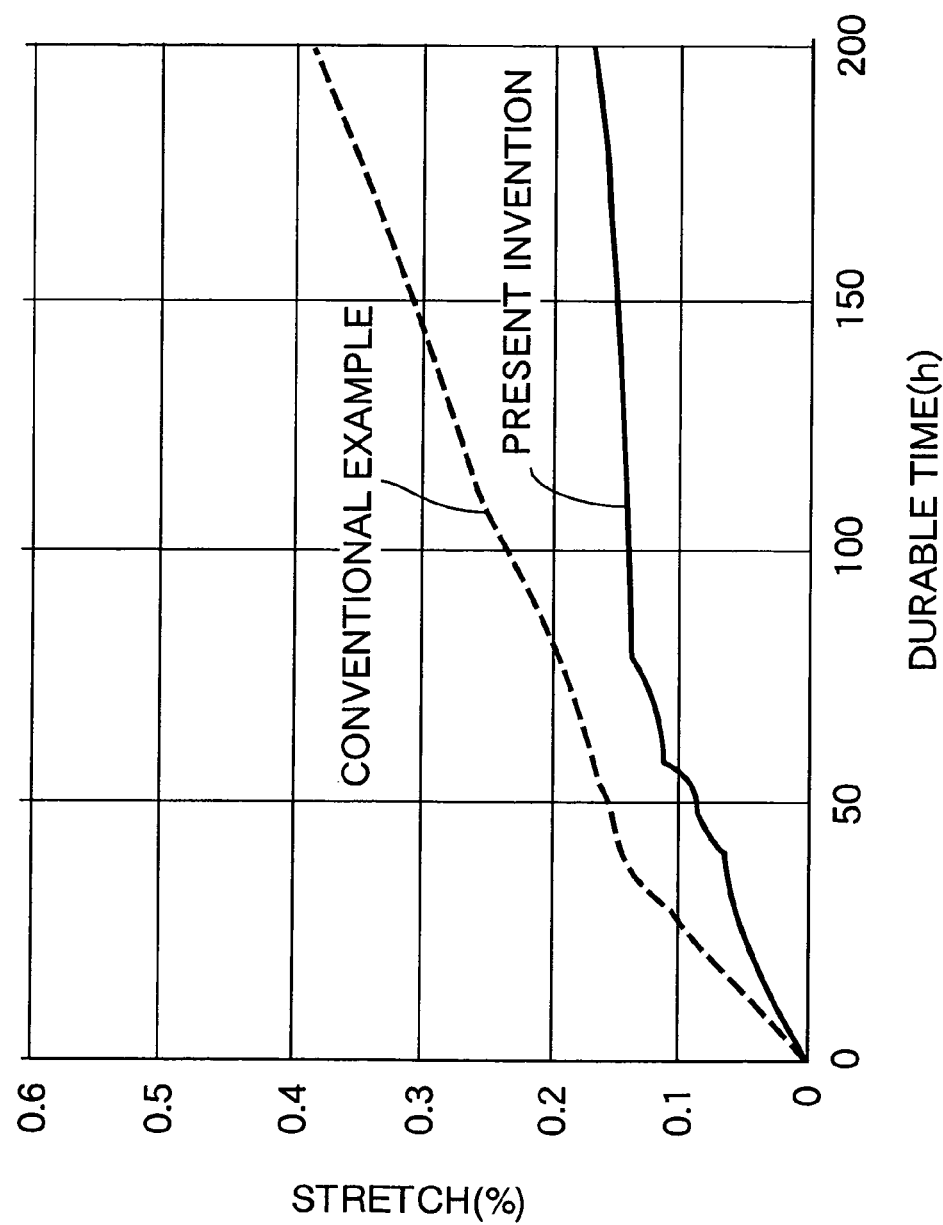
FIG. 7 is a graph showing a relationship between operation time and stretch of the silent chain.

FIG. 7 shows a relationship between the conventional silent chain Cs stretching and operation time compared to the silent chain Cs of the present invention having the above-described structure. When the pin 13 is worn and rattling is generated between the pin 13 and the pin hole 11a, a stretch is generated in the silent chain Cs. However, abrasion is reduced due to an excellent lubrication in the silent chain Cs of the present invention and the stretch is considerably reduced compared to the conventional silent chain, which results in improved durability of the silent chain Cs of the present invention.

Next, a second embodiment of the present invention will be described with reference to FIG. 5.

When the silent chain Cs is wound around the sprocket, the adjacent link plates 11o, 11i are relatively rotated by an angle θ calculated from 2π/(number of teeth of the sprocket). The smaller the diameter of the sprocket around which the silent chain Cs is wound (the smaller the number of teeth), the larger the angle θ. Thus, the angle θ is determined based on the sprocket whose diameter is smallest among the plurality of sprockets around which the silent chain Cs is wound.

As mentioned above, the inner link plate 11i is not relatively rotated with respect to the pin 13. Further, only the outer link plate 11o is relatively rotated with respect to the pin 13. Thus, the relative rotation angle between the pin 13 and the outer link plate 11o becomes θ. With the relative rotation angle θ, the outer circumferential surface 13a of the pin 13 is brought into sliding contact with the inner circumferential surface of the pin hole 11a over the length Rθ (R is the radius of the pin 13) in the circumferential direction. In this embodiment, a pitch P' in the circumferential direction of the helical groove 13b of the pin 13 is set to the sliding length Rθ or less (P'≦Rθ). With this structural arrangement, when the outer link plate 11o is relatively rotated with respect to the pin 13, at least one helical groove 13b passes all the positions on the inner circumferential surface of the pin hole 11a.

In this way, by setting the pitch P' in the circumferential direction of the helical groove 13b to the sliding length Rθ or less between the pin 13 and the pin hole 11a, one helical groove 13b is assured of always passing each position in its sliding range when the outer link plate 11o is relatively rotated with respect to the pin 13. Therefore, when the silent chain Cs is bent, a sufficient amount of oil is supplied to the sliding portions of the pin 13 and the outer link plate 11o which preserves an oil coating layer thereon to further improve durability of the silent chain Cs.

Figure 8:
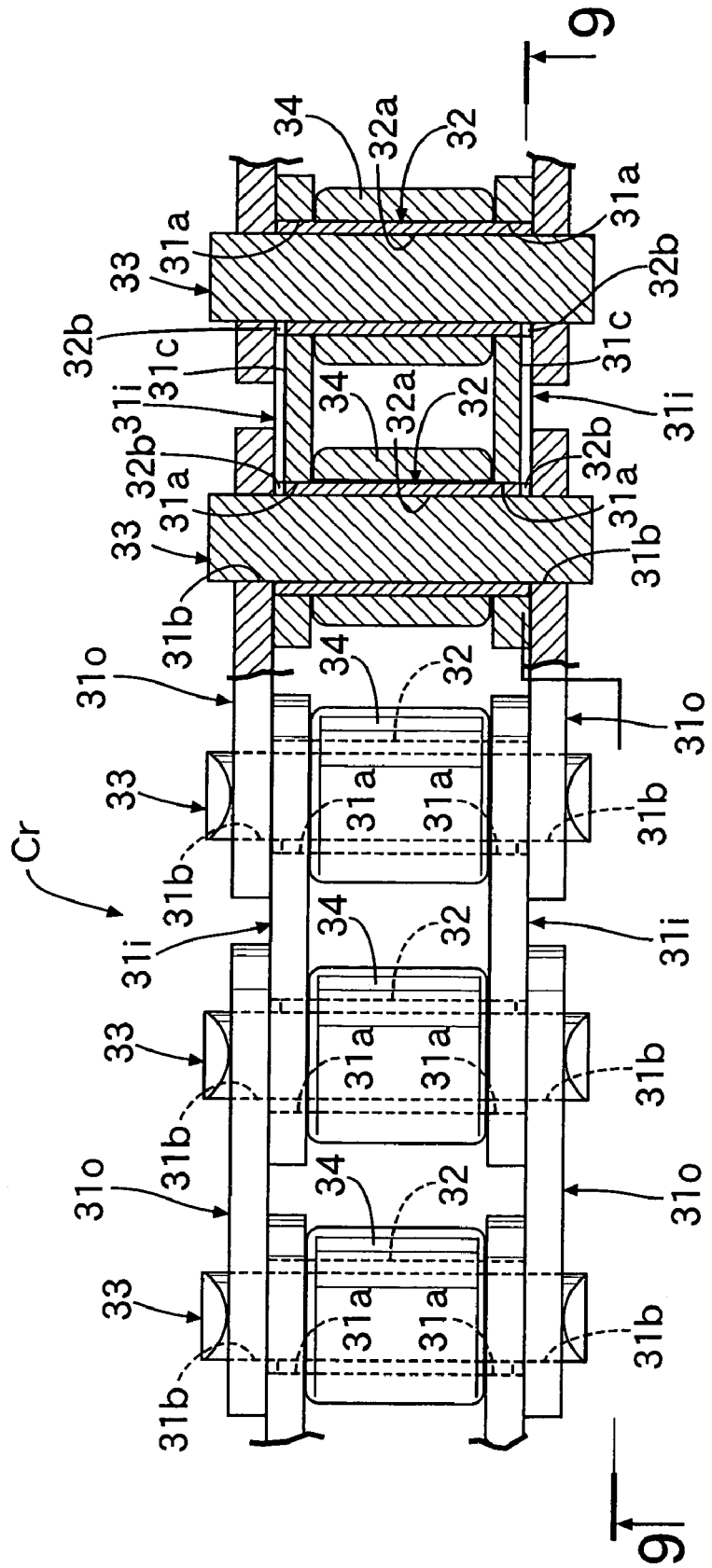
FIG. 8 is a side view of a roller chain according to a third embodiment of the present invention.
Figure 9:
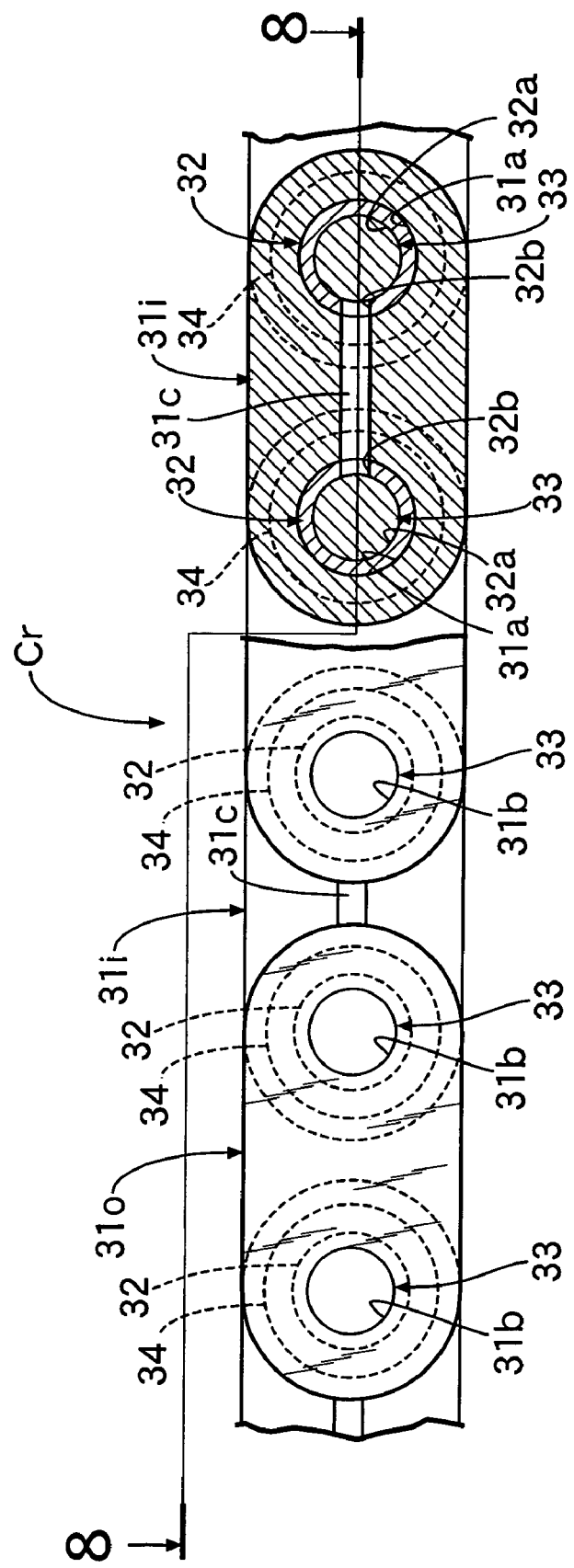
FIG. 9 is a sectional view taken along line 9-9 of FIG. 8.

FIGS. 8 to 11 show a third embodiment of the present invention. As shown in FIGS. 8 and 9, a roller chain Cr according to the third embodiment includes outer link plates 31o, inner link plates 31i, bushes 32, pins 33 and rollers 34. The inner link plate 31i has a pair of bush holes 31a, and opposite ends of the bush 32 are press fitted into the bush holes 31a of the two corresponding inner link plates 31i. Also, the outer link plate 31o has a pair of pin holes 31b, and opposite ends of the pin 33, which relatively rotatably penetrate the bush 32, are press fitted into the pin holes 31b of the two corresponding outer link plates 31o. The rollers 34 are relatively rotatably fitted on the outer circumference of the bush 32 that is held between the two inner link plates 31i.

Figure 11:
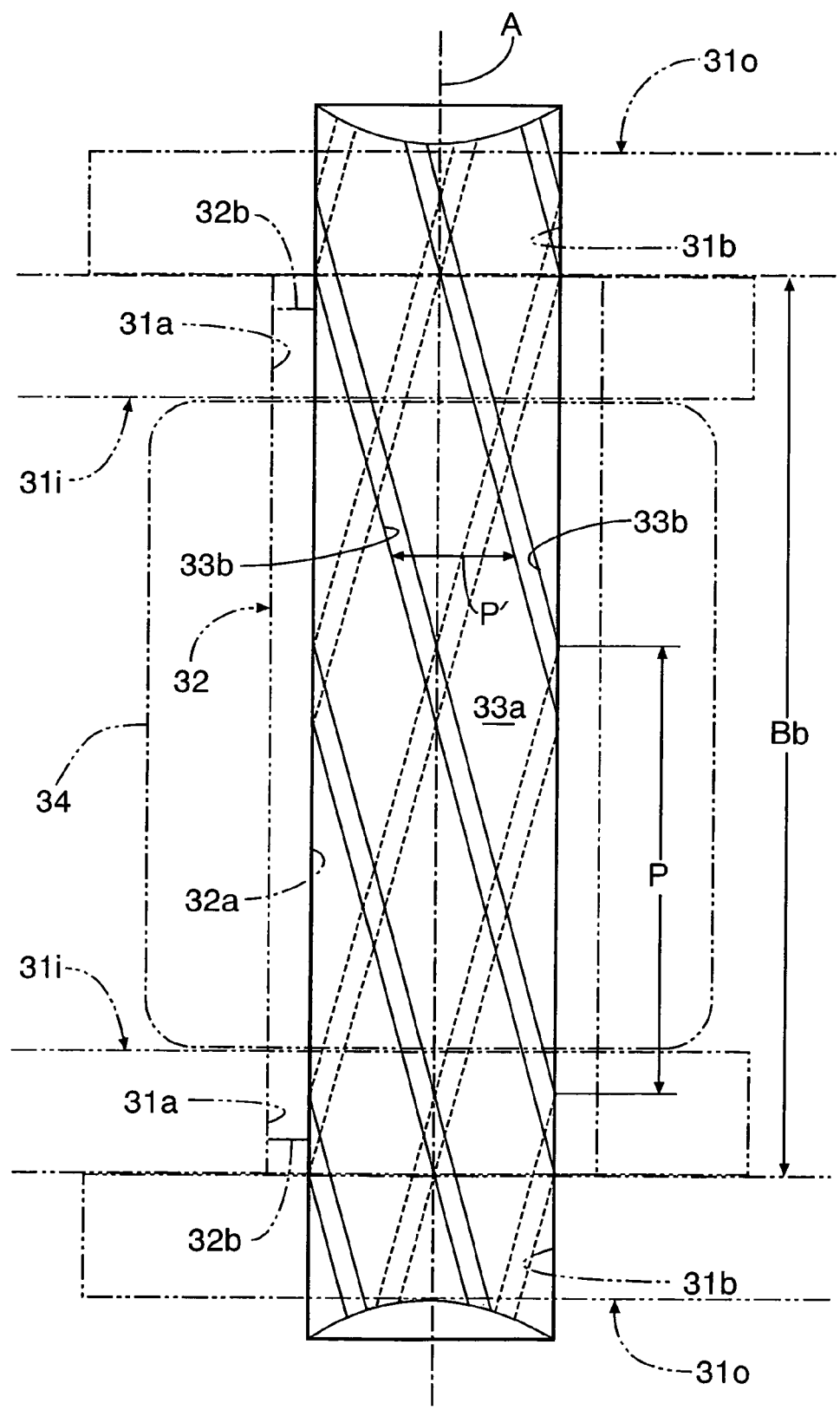
FIG. 11 is a front view of the pin.

As is clear from FIG. 11, four helical grooves 33b are formed on an outer circumferential surface 33a of the pin 33 with a phase difference of 180° C. The pitch P in the axial direction of the helical groove 33b is not more than the length Bb in the axial direction of the pin hole 32a of the bush 32 fitted on the outer circumference of the pin 33 and is set to a half or more of the length Bb. Thus, as in the case of the pin 13 in the first embodiment, one or two or three helical grooves 33b oppose an arbitrary generatrix of the pin hole 32a. Also, as in the case of the pin 13 in the second embodiment, when the relative rotation angle between the bush 32 and the pin 33 is θ and the radius of the pin 33 is R, the pitch P' in the circumferential direction of the helical groove 33b of the pin 33 is set to Rθ or less (P'≦Rθ).

Figure 10:
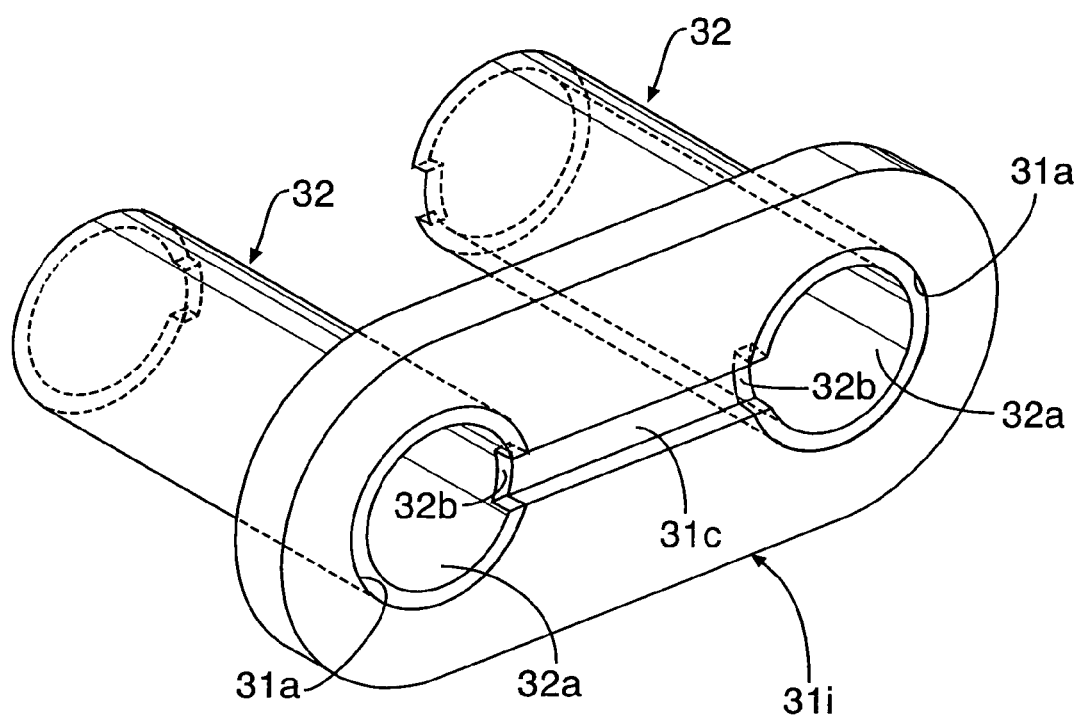
FIG. 10 is a perspective view of an inner link plate and a bush.

As is clear from FIG. 10, a recess groove 31c is formed on the outer surface of the inner link plate 31i in contact with the inner surface of the outer link plate 31o so that the recess groove 31c connects the pair of bush holes 31a to each other. The opposite ends of the recess groove 31c communicate with notches 32b formed in the bushes 32, which are press fit into the bush holes 31a.

Therefore, oil flowing into the recess groove 31c of the inner link plate 33i flows from the notches 32b to the pin holes 32a of the bushes 32 and is supplied to the helical grooves 33b of the pins 33 fit into the pin holes 32a, thereby improving the lubrication thereof. Also, one or two or three helical grooves 33b oppose the arbitrary generatrix of the pin hole 32a, and at least one helical groove 33b passes all the positions on the inner circumferential surface of the pin hole 32a of the bush 32 when the bush 32 is relatively rotated with respect to the pin 33. Thus, it is possible to securely lubricate the pin and pin hole while preventing an excessive surface pressure in the sliding portions of the bush 32 and the pin 33.

The largest tensile force of the roller chain Cr acts on a portion of the pin hole 32a of the bush 32 facing the bush hole 31a of the inner link plate 31i, and thus, this portion is under the severest lubrication condition. Considering this, if the pitch P of the helical groove 33b of the pin 33 is further reduced so that one or more helical grooves 33b oppose an arbitrary generatrix of the pin hole 32a of the bush 32 within a range of the thickness of the inner link plate 31i, durability of the roller chain Cr is further improved.

The embodiments of the present invention have been described, but various design changes can be made to the present invention without departing from the subject matter thereof.

For example, the pins of the first-to-fourth features may be used as any pin and not for a chain.

Also, the pin 13, 33 in the above-described embodiments, has four or two helical grooves 13b, 33b, but the number of helical grooves 13b, 33b may be 1, 3 or 5 or more.

Further, instead of forming the helical grooves 13b by rolling, they can be formed by etching.

Furthermore, the turning directions of the helical grooves 13b, 33b are not required to be the same, and a plurality of helical grooves 13b, 33b turning in opposite directions may be arranged so that they alternately cross each other. In this case, the helical grooves 13b, 33b may be formed by polishing after knurling, for example, or by any other well-known or later developed method.

Moreover, in the first and the second embodiments, the thickness of the inner link plate 11i is set to a half of that of the outer link plate 11o, but the thickness of the link plates 11o and 11i may be changed as is appropriate.

In the embodiments, the pitch P' in the circumferential direction of the helical grooves 13b, 33b is set based on the angle θ between the adjacent link plates 11o, 11i; 31o, 31i when the silent chain Cs or the roller chain Cr is wound around the sprocket, but the pitch P' in the circumferential direction of the helical grooves 13b, 33b may be set to P'≦R(θ+θ') where θ' is an angle when the silent chain Cs or the roller chain Cr is brought into contact with a chain tensioner.

What is claimed is:

1. A pin, which comprises a cylindrical outer circumferential surface defined about an axis, and at least one helical groove formed in the outer circumferential surface of the pin, wherein the pin is rotatably supported by a pin hole of a mating member,
wherein a pitch between adjacent helical grooves in an axial direction is equal to or less than a width in an axial direction of the pin hole supporting the pin, and
wherein the mating member includes at least one recess groove defined in an outer surface thereof, the recess groove being in communication with the at least one helical groove.

2. The pin according to claim 1, wherein the pitch is a half or more of the width in the axial direction of the pin hole.

3. The pin according to claim 1, wherein the outer circumferential surface of the pin comprises a coating which includes a coating base and hard particles dispersed in the coating base.

4. A chain, comprising a plurality of link plates which include the mating members, the link plates being connected to each other by a plurality of pins according to claim 1,
wherein each link plate has a recess groove defined therein which provides a connection between the pin holes formed at opposite ends of the link plate, and which guides oil to the outer circumferential surfaces of the pins.

5. A pin, which comprises a cylindrical outer circumferential surface defined about an axis, and a plurality of helical grooves formed in the outer circumferential surface of the pin,
wherein the pin is rotatably supported by a pin hole of a mating member,
wherein, when a radius of the pin is R and a relative rotation angle with the mating member is θ, the angle θ being less than $2\pi$, a pitch in a circumferential direction between adjacent helical grooves is Rθ or less, and
wherein the mating member includes at least one recess groove defined in an outer surface thereof, the recess groove being in communication with the at least one helical groove.

6. The pin according to claim 5, wherein the outer circumferential surface of the pin comprises a coating which includes a coating base and hard particles dispersed in the coating base.

7. A chain, comprising a plurality of link plates, which include the mating members, the link plates being connected to each other by a plurality of pins according to claim 5,
wherein each link plate has a recess portion defined therein which provides a connection between a part of an outer edge of the link plate and the pin hole, and which guides oil to the outer circumferential surfaces of the pins.

8. A chain, comprising a plurality of link plates which include the mating members, the link plates being connected to each other by a plurality of pins, wherein each pin comprises a cylindrical outer circumferential surface defined about an axis, and at least one helical groove formed in the outer circumferential surface of the pin, wherein the pin is rotatably supported by a pin hole of a mating member, wherein a pitch between adjacent helical grooves in an axial direction is equal to or less than a width in an axial direction of the pin hole supporting the pin, and wherein each link plate has a recess groove defined therein which provides a connection between the pin holes formed at opposite ends of the link plate, and which guides oil to the outer circumferential surfaces of the pins.

9. The pin according to claim 8, wherein the pitch is a half or more of the width in the axial direction of the pin hole.

10. The pin according to claim 8, wherein the outer circumferential surface of the pin comprises a coating which includes a coating base and hard particles dispersed in the coating base.

11. A chain, comprising a plurality of link plates, which include the mating members, the link plates being connected to each other by a plurality of pins, wherein each pin comprises a cylindrical outer circumferential surface defined about an axis, and at least one helical groove formed in the outer circumferential surface of the pin,
wherein the pin is rotatably supported by a pin hole of a mating member,
wherein, when a radius of the pin is R and a relative rotation angle with the mating member is θ, the angle θ being less than 2π, a pitch in a circumferential direction between adjacent helical grooves is Rθ or less wherein each link plate has a recess portion defined therein which provides a connection between a part of an outer edge of the link plate and the pin hole, and which guides oil to the outer circumferential surfaces of the pins.

12. The chain according to claim 11, wherein the outer circumferential surface of each pin comprises a coating which includes a coating base and hard particles dispersed in the coating base.

13. A silent chain comprising inner link plates, outer link plates, guide plates and pins, wherein guide rows, each formed of the inner link plate and the guide plates, and link rows, each formed of the outer link plats, are alternately linked to each other by the pins, in such a manner that each said pin relatively rotatably penetrates pin holes of the associated inner and outer link plates and is integrally fixed into pin holes of the associated guide plates which are positioned outside the outer link plates, wherein each said pin comprises a cylindrical outer circumferential surface defined about an axis, and at least one helical groove formed in the outer circumferential surface of the pin, and wherein a pitch between adjacent helical grooves in an axial direction is equal to or less than a width in an axial direction of the pin hole of one of the associated inner and outer link plates.

14. The silent chain according to claim 13, wherein the pitch is a half or more of the width in the axial direction of the pin hole.

15. The silent chain according to claim 13, wherein the at least one helical groove necessarily opposes a straight line extending parallel to the axis of the pin and defined on an inner circumferential surface of the pin hole at any circumferential position of the pin hole.

16. The silent chain according to claim 13, wherein the outer circumferential surface of the pin comprises a coating which includes a coating base and hard particles dispersed in the coating base.

17. A silent chain comprising inner link plates, outer link plates, guide plates and pins, wherein guide rows, each formed of the inner link plate and the guide plates, and link rows, each formed of the outer link plates, are alternately linked to each other by the pins, in such a manner that each said pin relatively rotatably penetrates pin holes of the associated inner and outer link plates and is integrally fixed into pin holes of the associated guide plates which are positioned outside the outer link plates, wherein the pin comprises a cylindrical outer circumferential surface defined about an axis, and a plurality of helical grooves formed in the outer circumferential surface of the pin, and wherein, when a radius of the pin is R and a relative rotation angle with one of the associated inner and outer link plates is θ, the angle θ being less than 2π, a pitch in a circumferential direction between adjacent helical grooves is Rθ or less.

18. The silent chain according to claim 17, wherein the outer circumferential surface of the pin comprises a coating which includes a coating base and hard particles dispersed in the coating base.

* * * * *